United States Patent
Albert Reginold et al.

(10) Patent No.: US 10,071,657 B2
(45) Date of Patent: Sep. 11, 2018

(54) DOUBLE FITTING FOR A VEHICLE SEAT, AND VEHICLE SEAT

(71) Applicant: Johnson Controls Components GmbH & Co. KG, Kaiserslautern (DE)

(72) Inventors: Kirubaharan Albert Reginold, Burscheid (DE); Ulrich Lehmann, Alfter (DE); Reinhard Kraus, Remscheid (DE); Bernd Bossmanns, Mettmann (DE); Rolf Schueler, Heiligenhaus (DE)

(73) Assignee: Johnson Controls Components GmbH & Co. KG, Kaiserslautern (DE)

( * ) Notice: Subject to any disclaimer, the term of this patent is extended or adjusted under 35 U.S.C. 154(b) by 62 days.

(21) Appl. No.: 15/124,174

(22) PCT Filed: Mar. 3, 2015

(86) PCT No.: PCT/EP2015/054337
§ 371 (c)(1),
(2) Date: Sep. 7, 2016

(87) PCT Pub. No.: WO2015/132215
PCT Pub. Date: Sep. 11, 2015

(65) Prior Publication Data
US 2017/0015220 A1    Jan. 19, 2017

(30) Foreign Application Priority Data

Mar. 7, 2014   (DE) .................... 10 2014 204 285
May 12, 2014   (DE) .................... 10 2014 208 852

(51) Int. Cl.
*B60N 2/22*   (2006.01)
*B60N 2/225*   (2006.01)
(Continued)

(52) U.S. Cl.
CPC ........... *B60N 2/2254* (2013.01); *B60N 2/236* (2015.04); *B60N 2/2356* (2013.01); *B60N 2/682* (2013.01)

(58) Field of Classification Search
CPC .... B60N 2/2254; B60N 2/236; B60N 2/2356; B60N 2/682
(Continued)

(56) References Cited

U.S. PATENT DOCUMENTS

| | | |
|---|---|---|
| 4,713,986 A | 12/1987 | Cremer et al. |
| 7,695,068 B2 | 4/2010 | Maeda et al. |
| 8,152,241 B2 * | 4/2012 | Krueger ............... B60N 2/2252 297/367 R X |

FOREIGN PATENT DOCUMENTS

| | | |
|---|---|---|
| DE | 31 29 672 C1 | 10/1982 |
| DE | 35 29 887 A1 | 3/1987 |

(Continued)

OTHER PUBLICATIONS

German Office Action dated Jan. 12, 2017.
(Continued)

*Primary Examiner* — Anthony D Barfield
(74) *Attorney, Agent, or Firm* — McGlew and Tuttle, P.C.

(57) ABSTRACT

A vehicle seat double fitting (10) includes two fittings (100) operatively connected to each other and each with a first fitting part (111) and a second fitting part (112) that are rotatable relative to one another around an axis (A) and are in geared connection or locked to one another. An adapter part (150) is connected to one of the first fitting parts (111) or the second fitting parts (112) and a second adapter part (160) is connected to other of the first fitting parts (111) or the second fitting parts (111, 112). Exactly one adapter part (150, 160) is fixedly connected to a structural part (3) of the vehicle seat and the other of the two adapter parts (150, 160) is limitedly moveable or rotatable around the axis (A), (Continued)

relative to the structural part (3) and the adapter part (150, 160) fixedly connectable to the structural part (3).

9 Claims, 6 Drawing Sheets

(51) Int. Cl.
    *B60N 2/68*               (2006.01)
    *B60N 2/235*            (2006.01)

(58) Field of Classification Search
    USPC .................................................... 297/367 R
    See application file for complete search history.

(56) References Cited

FOREIGN PATENT DOCUMENTS

| | | |
|---|---|---|
| DE | 10 2006 000 532 A1 | 6/2007 |
| DE | 10 2006 015 559 B3 | 8/2007 |
| DE | 10 2009 041 490 A1 | 3/2011 |
| DE | 10 2009 053 250 A1 | 5/2011 |
| DE | 10 2011 012 076 A1 | 8/2012 |
| DE | 10 2004 049 114 B4 | 12/2013 |
| DE | 10 2014 204 558 A1 | 7/2015 |
| EP | 1 574 391 A1 | 9/2005 |
| FR | 2 923 425 A1 | 5/2009 |
| JP | H10-71042 A | 3/1998 |
| JP | 2009-532143 A | 9/2009 |

OTHER PUBLICATIONS

Extract from Wikipedia about the Range Rover (L405).
Delivery notes.
Excerpt from the technical drawing for the material No. CO5076-101 (Drawing No. DO507 6-101).
Extract from the technical drawing to the material No. 912014-100 (Drawing No. 712014-100).
Excerpt from the technical drawing for the material No. C00306-102 (Drawing No. D00304-104).
Extract from the technical drawing for the material No. C00494-101 (Drawing No. D00496-102).
Extract from the technical drawing for the material No. C21330-101 (Drawing No. D21330-101).
Extract from the technical drawing to the material No. 989877-103 (Drawing No. 789877-104).
Excerpt from the technical drawing for the material No. CO5159-100 (Drawing No. DO5159-101).
Overview of the relationship between the material No. CO5076-101. Technical drawings.

\* cited by examiner

DOUBLE FITTING FOR A VEHICLE SEAT, AND VEHICLE SEAT

CROSS REFERENCE TO RELATED APPLICATIONS

This application is a U.S. National Phase Application of International Application PCT/EP2015/054337 filed Mar. 3, 2015 and claims the benefit of priority under 35 U.S.C. § 119 of German Applications 10 2014 204 285.2 filed Mar. 7, 2014 and 10 2014 208 852.6 filed May 12, 2014, the entire contents of which are incorporated herein by reference.

FIELD OF THE INVENTION

The invention relates to a double fitting for a vehicle seat, in particular for a motor vehicle seat, having two fittings which are operatively connected to one another, wherein each of the two fittings has a first fitting part and a second fitting part which are rotatable relative to one another about an axis, wherein the first fitting part and the second fitting part are in geared connection with one another or can be locked together, and two adapter parts which are arranged adjacent to one another in an axial direction and of which a first adapter part is connected to one of the two first fitting parts and a second adapter part is connected to the other of the two first fitting parts, or the first adapter part is connected to one of the two second fitting parts and the second adapter part is connected to the other of the two second fitting parts. The invention also relates to a vehicle seat having a backrest, which comprises a backrest structure, and a seat cushion, which comprises a seat cushion structure, wherein the backrest structure is articulated on the seat cushion structure by way of a double fitting.

BACKGROUND OF THE INVENTION

In the case of vehicle seats with belt integration, that is to say vehicle seats in the case of which some or all fastening points of a safety belt system are connected to the vehicle seat, the fact that a safety belt or a belt retractor mechanism of the safety belt is connected to the backrest upper edge of a backrest of the vehicle seat has the effect that, in the event of a crash, considerably higher loads act in a fitting, which serves as a backrest adjuster, than in the case of vehicle seats without belt integration. The required high outlay for development for fittings designed specifically for such high loads is, from an economic aspect, often opposed to the normally low production numbers of such belt-integral seats. Since the strength requirements for fittings in belt-integral seats are often in the range of twice the strength of fittings for conventional seats without belt connection to the backrest, it is normally the case that, for belt-integral seats, two identical fittings are connected in parallel to form a double fitting and are fixedly connected to one another in order to thereby provide, in an economical manner, a fitting for a belt-integral seat. DE 35 29 887 A1 has disclosed a double fitting of said type.

In the case of two single fittings being connected in parallel and rigidly connected to one another to form a double fitting, the loads in the event of a crash are distributed between the two interconnected fittings, such that the strength requirements are met. It is however sought for the mechanisms in the two fittings, despite the rigid connection to one another, to also satisfy functional requirements with regard to an elimination of play during driving operation and with regard to maximum admissible actuation moments during adjustment, such as is conventional in the case of single fittings. For this purpose, however, no satisfactory solution which satisfies these functional requirements is known from the prior art.

In the case of continuous backrest adjusters being used, that is to say classic tumble mechanism fittings with wedge eccentrics for elimination of play, which are also referred to as geared fittings and which are known for example from DE 10 2011 012 076 A1, it is known for component tolerances to be compensated by way of a wedge eccentric system comprising two oppositely spring-preloaded wedge segments. Here, the effective axis spacing of the two gearing parts relative to one another automatically adjusts, by way of the wedge movement, to the extent required for the elimination of play. During the course of the expected overall fluctuation of component tolerances of the individual parts of a single fitting, it is possible with this technology to economically produce play-free and nevertheless easily adjustable single fittings. In the case of an absolutely rigid connection of two individual fittings to one another, that is to say a rigid connection of two first fitting parts to one another and of two second fitting parts to one another, in the case of which an identical axis spacing dimension is fixed to an identical dimension for both fittings, the effectively required axis spacings of the two interconnected fittings can no longer be adjusted independently of one another. As a result, it is necessary for further, relatively high demands to be placed on the tolerance compensation capability of the wedge eccentric systems, or the admissible tolerance range of the individual parts must be restricted to a greater extent than is necessary for individual fittings. Both possibilities entail additional outlay in the production process, be it in the production of the individual parts, in the need for other individual parts to be assembled together or in the joining process during which the individual fittings must be connected to one another in a precise alignment relative to one another.

DE 10 2006 000 532 A1 has disclosed a double fitting having two interconnected fittings, wherein each of the two fittings has a first fitting part and a second fitting part which are in toothed engagement with one another. One of the two fittings has a wedge eccentric, which is arranged between the first fitting part and the second fitting part, for the elimination of play in the toothed engagement. The other of the two fittings has, instead of a wedge eccentric, a support element which is arranged between the first fitting part and the second fitting part and which has a smaller eccentricity than the wedge eccentric of the other fitting. During the normal operation of the double fitting, only the wedge eccentric but not the support element bears load. After a limited deformation in the double fitting, such as arises in particular in the event of a vehicle collision, the support element additionally supports the toothed engagement.

DE 10 2004 049 114 B4 discloses a double fitting which comprises a first fitting part, a second fitting part and an eccentric which are each arranged on a common axis of rotation. The first fitting part is formed from two first fitting part elements. The second fitting part is formed from two second fitting part elements.

SUMMARY OF THE INVENTION

The invention is based on the problem of improving a double fitting of the type mentioned in the introduction, in particular of connecting two fittings, such as are known per se, to one another such that the correct functioning thereof during normal use is realized without additional outlay and, nevertheless, in the event of a crash, both fittings jointly accommodate the high load. Furthermore, it is sought to provide a vehicle seat having a double fitting of said type, which double fitting satisfies high demands with regard to strength and functionality.

In the case of a double fitting for a vehicle seat according to the invention, in particular for a motor vehicle seat, having two fittings which are operatively connected to one another, wherein each of the two fittings has a first fitting part and a second fitting part which are rotatable relative to one another about an axis, wherein the first fitting part and the second fitting part are in geared connection with one another or can be locked together, and having two adapter parts which are arranged adjacent to one another in an axial direction and of which a first adapter part is connected to one of the two first fitting parts and a second adapter part is connected to the other of the two first fitting parts, or the first adapter part is connected to one of the two second fitting parts and the second adapter part is connected to the other of the two second fitting parts, it is the case that exactly one of the adapter parts is fixedly connectable or connected to a structure part of the vehicle seat and the other of the two adapter parts is movable to a limited extent, in particular rotatable about the axis, relative to the structure part and relative to the adapter part which is fixedly connectable or connected to the structure part.

By virtue of the fact that exactly one of the adapter parts is fixedly connectable or connected to a structure part of the vehicle seat and the other of the two adapter parts is movable to a limited extent, in particular rotatable about the axis, relative to the structure part and relative to the adapter part which is fixedly connectable or connected to the structure part, it is possible for two fittings such as are known per se to be connected to one another such that they do not adversely affect one another with regard to the elimination of play and the correct functioning thereof during normal use is realized without additional outlay. In the case of a double fitting installed in a vehicle seat, it is the case that, after a small amount of deformation in the event of a crash, the mobility between the adapter parts is exhausted, and both fittings jointly accommodate the crash load. The adapter parts may be formed separately from the fitting parts or may be integrated therein.

In other words, the problem is solved in that two fittings of the double fitting according to the invention are fixedly connected to one another on one of two mechanism sides of the fittings, for example on the side assigned to the seat cushion, whereas said fittings exhibit free play relative to one another on the other side, which free play exists at all times during normal operation of the vehicle seat. It is thus possible for the two fittings, in ranges relevant for essential functional characteristics, to perform their function in a mutually decoupled state, whereas in the event of a crash, after a definable deformation of the first fitting and/or of a structural part, said play is overcome, the second fitting comes into contact with the first fitting in the load direction, and then both fittings jointly accommodate the load.

Limited mobility between two adapter parts of the double fitting can be realized easily by virtue of one of the two adapter parts having a projection which engages with play into a receptacle of the other of the two adapter parts. In the case of a fitting installed in the vehicle seat, both adapter parts, and thus both fittings, are fixedly connected to the structure part in the load direction when said play has been passed through as a result of deformation in fitting parts and/or structure parts of the vehicle seat.

It is preferably the case that, after a limited relative movement between the first adapter part and the second adapter part, the projection bears against a contact contour of the receptacle. The receptacle of the adapter part may be an opening in said adapter part. The contact contour may be a cylindrical inner surface of the opening. The projection of the adapter part may be a pushed-out portion in said adapter part. In this way, the double fitting according to the invention can be produced inexpensively.

A high-strength, symmetrical connection between the first adapter part and the second adapter part can be realized by virtue of both adapter parts each having a projection and a receptacle which engage reciprocally into one another.

An additional increase in strength of the double fitting can be achieved by virtue of an engaging-around portion which is fastened to one of the two adapter parts engaging in a radial and/or axial direction around the other of the two adapter parts without impeding the limited relative movement between the first adapter part and the second adapter part. The engaging-around portion acts in particular when the play between projection and receptacle has been passed through. The action of the engaging-around portion in an axial direction may however be independent of the relative position of the adapter parts in a circumferential direction.

An engaging-around portion which acts in the circumferential direction is, in a preferred embodiment, characterized in that the engaging-around portion is of U-shaped form and comprises two flanges which point in an axial direction and which, between them, at least partially receive at least one of the two adapter parts. The U-shaped engaging-around portion may be closed by way of a closure plate such that the engaging-around portion completely surrounds at least one adapter part in sections, which leads to a particularly high-strength engaging-around portion.

At least one of the two adapter parts may have a hook-shaped engaging-around portion which engages over the other of the two adapter parts and secures the latter in an axial direction. In this way, even a relatively small and inexpensive engaging-around portion can realize a high level of axial strength between the adapter parts.

A preferred engaging-around portion may be formed separately or may be integrated into one of the adapter parts. The two adapter parts may each have at least one engaging-around portion, such that the two adapter parts engage reciprocally around one another.

The load on the double fitting in the event of a crash is a complex, three-dimensional load of the two fittings of the double fitting, because a belt fastened to the top edge of the backrest structure at the belt retractor mechanism pulls forward and obliquely inward, and thus, in addition to a main torque in the plane of the adapter parts, there is also a considerable torsional load on the double fitting. The engaging-around portion, which must likewise exhibit the required play between the components involved, targetedly counteracts the torsion load and can additionally considerably increase the accommodation of load by the double fitting. The specific design of said engaging-around portion may assume an extremely wide variety of embodiments; the described exemplary embodiments present merely exemplary solutions.

Double fittings can be developed and produced particularly inexpensively if both adapter parts are identical parts. In this way, two adapter parts produced using an identical tool can be combined with one another, in particular by being situated opposite one another with a rotational offset.

If one considers the load-bearing capacity of a single fitting as a function of the load torque versus the deformation angle, there is, for all fittings of one structural type, a resulting characteristic, substantially always identical profile which is defined by the deformation of the fitting components under load. Depending on the vehicle, vehicle seat construction and further boundary conditions, it is often desirable, for the purposes of reducing the maximum load acting on the occupants, to realize a dissipation of the crash energy by way of a targeted deformation of the seat structure or of the structure parts thereof. The double fitting according to the invention offers the possibility, by way of a simple geometrical design, of targetedly controlling such deformations in a simple manner by virtue of the contact geometry between the adapter parts in the load direction being assigned targetedly elastic, deformable zones which, in the event of a crash, lead to the desired torque/angle profile in a controlled and exactly precalculable manner.

The double fitting preferably has two geared fittings. It may however also be advantageous for a double fitting constructed from two detent-type fittings to be designed according to the invention. The basic problem of the mutual influencing of functioning in the case of a non-exact position of the individual fitting centers relative to one another exists in the case of detent-type fittings, too, and can—for example in the case of large angles being passed through for the free pivoting of the backrest—lead to undesired contact situations and increased pivoting forces. Since, furthermore, otherwise identical seats for different vehicles have, in some cases, detent fittings for manual operation and, in other cases, electrically operated geared fittings for electrified adjustment, and for this reason the interface geometries of modular backrest adjuster families are of identical design, the use of identical adapter parts also for detent-type fittings is expedient.

A vehicle seat according to the invention has a first structure part and a second structure part, wherein the first structure part is articulated on the second structure part by way of a double fitting according to the invention. The first structure part may be a backrest structure. The second structure part may be a seat cushion structure.

A vehicle seat according to the invention may have a backrest, which comprises a backrest structure, and a seat cushion, which comprises a seat cushion structure, wherein the backrest structure is articulated on the seat cushion structure by way of a double fitting according to the invention. The backrest of the vehicle seat according to the invention can thus accommodate high belt forces without the functional characteristics, in particular operating and adjustment forces, being uncomfortably high. The double fitting is preferably arranged in the region of a seat outer side. A single fitting or a simple rotary bearing may be arranged on the opposite seat outer side.

Exactly one of the two adapter parts may be fixedly connected to the backrest structure of the vehicle seat, and the other of the two adapter parts may be movable to a limited extent, in particular rotatable about the axis, relative to the backrest structure and relative to the adapter part which is fixedly connected to the backrest structure. Alternatively, exactly one of the two adapter parts may be fixedly connected to the seat cushion structure of the vehicle seat and the other of the two adapter parts may be movable to a limited extent, in particular rotatable about the axis, relative to the seat cushion structure and relative to the adapter part which is fixedly connected to the seat cushion structure.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
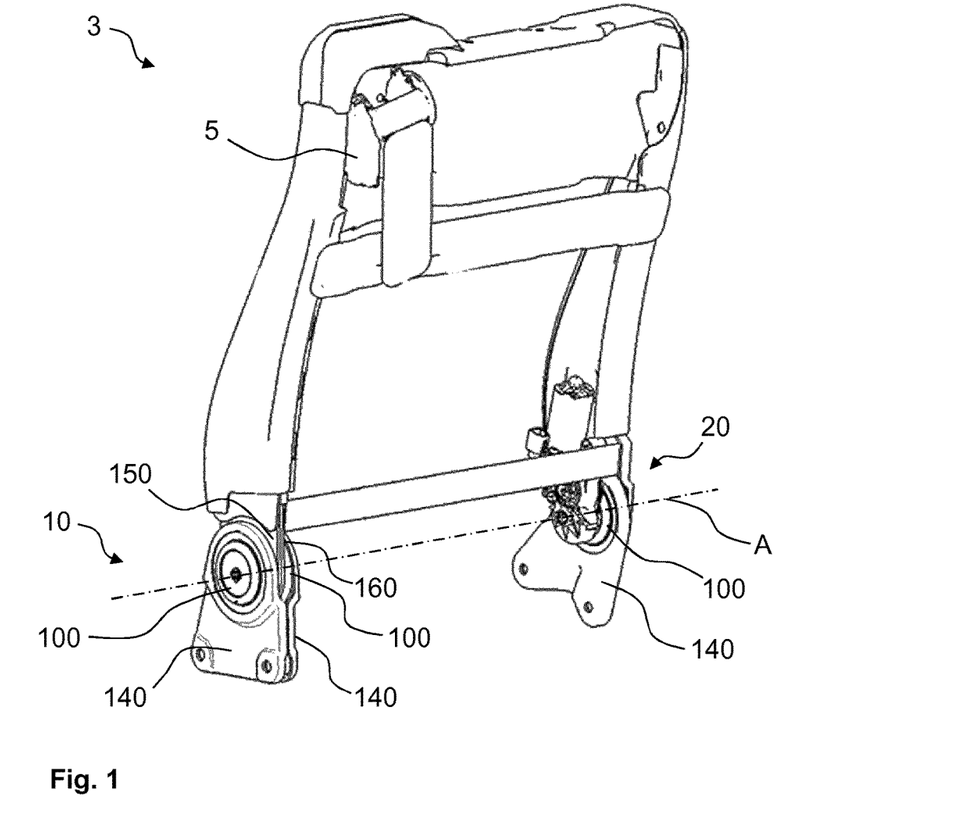
FIG. 1 is a schematic, perspective rear view of a backrest structure of a vehicle seat having an integrated belt retractor mechanism and having a fitting system comprising a single fitting and a double fitting.

Referring to the drawings, a vehicle seat (not fully illustrated in the figures) comprises a seat cushion and a backrest which is adjustable in terms of inclination relative to the seat cushion. This basic construction is known for example from DE 10 2006 000 532 A1. FIG. 1 shows a backrest structure 3 of the backrest of the vehicle seat from a rear view, that is to say from a rear side, which faces away from an occupant, of the backrest structure 3.

The backrest structure 3 is connected, by way of a fitting system, to a structure (not illustrated in the figures) of the seat cushion. The fitting system comprises a double fitting 10 according to the invention and a single fitting 20. The fitting system serves for the adjustment of the inclination of the backrest and for the transmission of forces from the backrest into the structure of the seat cushion. The double fitting 10 comprises two fittings 100 and can therefore bear higher forces and torques than the single fitting 20, which comprises one fitting 100, before failure of the double fitting 10 occurs.

A belt retractor mechanism 5 of a three-point belt system which secures the occupant of the vehicle seat is arranged in an upper corner region of the backrest structure 3. In the event of a crash, belt forces are introduced via the belt retractor mechanism 5 into the backrest structure 3. Said belt forces are, for the most part, accommodated and conducted into the structure of the seat cushion by way of the double fitting 10 which is arranged on an outer side of the backrest structure 3 below the belt retractor mechanism 5, whereas the single fitting 20 arranged on the opposite outer side of the backrest structure 3 is subject to considerably lower loads, and can thus be realized as a single standard component.

In all exemplary embodiments, the double fitting 10 is composed of two identical fittings 100 such as are known per se, the construction of which corresponds to that of a fitting 100 of the single fitting 20. Each of the two fittings 100 comprises a first fitting part 111 and a second fitting part 112, which are rotatable relative to one another about an axis A and which—in the case of the fittings 100 being in the form of geared fittings, are in geared connection with one another or—in the case of the fittings 100 being in the form of detent-type fittings—can be locked together. The axis A defines the directional statements, used below, relating to a cylindrical coordinate system.

The inclination of the backrest structure 3 can be adjusted about the axis A by way of the fitting system. In the case of geared fittings (tumble fittings), the axis A tumbles slightly with an eccentricity of the geared fittings relative to a vehicle coordinate system. The basic construction of a double fitting 10 can be seen from FIGS. 4, 11 and 12.

The two second fitting parts 112 are connected to the backrest structure 3 of the vehicle seat by way of adapter parts. Here, a first adapter part 150 is connected to one of the two second fitting parts 112, and a second adapter part 160 is connected to the other of the two second fitting parts 112. For this purpose, the adapter parts 150, 160 each have a second interface 175, in the present case an opening, into which the second fitting part 112 is partially inserted and welded to the respective adapter part 150, 160. One of the two adapter parts 150, 160, in the present case the first adapter part 150, is fixedly connected to the backrest structure 3. The second adapter part 160 is rotatable slightly relative to the first adapter part 150, as will be described in detail below.

The two first fitting parts 111 of the two fittings 100 of the double fitting 10 are arranged mirror-symmetrically with respect to one another and, in the present case, are fixedly connected, by way of screw connections, to one another and to the structure of the seat cushion by way of two bottom parts 140. The bottom parts 140 each have a first interface 145, in the present case an opening, into which the first fitting part 111 is partially inserted and welded to the respective bottom part 140.

The Figures illustrate a total of six exemplary embodiments of a double fitting 10 according to the invention, which differ from one another in particular in the region of the adapter parts 150, 160.

Figure 2:
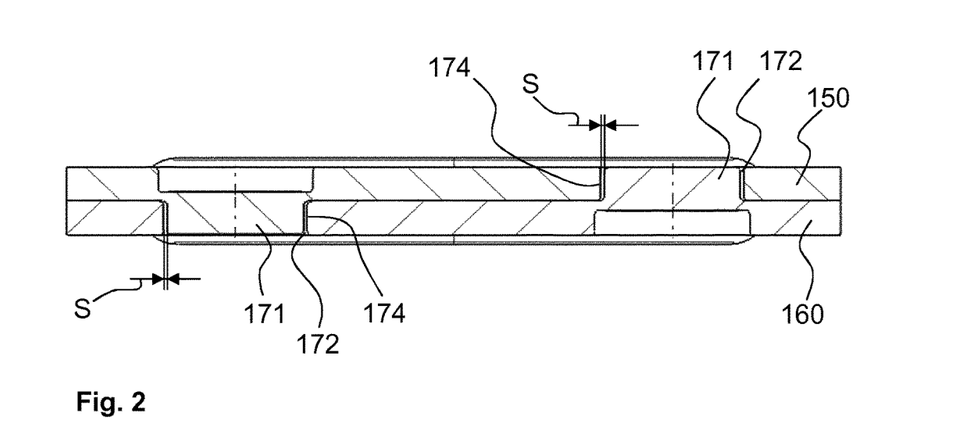
FIG. 2 is a sectional view through a first adapter part and a second adapter part of a double fitting according to the invention as per a first exemplary embodiment.

FIG. 2 shows a section through a first exemplary embodiment. The two adapter parts 150, 160 are of similar, in the present case identical, construction, and are arranged axially opposite and so as to bear against one another. The two adapter parts 150, 160 comprise in each case a projection 171 and a bore-like receptacle 172, which is larger to a defined extent and which has a contact contour 174. The contact contour 174 is, in the present case, the cylindrical inner surface of the bore-like receptacle 172. Each receptacle 172 is engaged into by in each case one projection 171 of the other adapter part 150, 160.

A play S between projection 171 and contact contour 174, said play resulting from a diameter difference between projection 171 and receptacle 172, makes it possible for the two adapter parts 150, 160, and thus the second fitting parts 112 connected thereto, to move relative to one another and thus prevents direct influencing of the mutual functionality in the normal usage situation and during driving operation. The magnitude of the play S is preferably not constant over the circumference of the projection 171, but has, over the circumference, at a minimum the value required for the compensation of axial tolerances of the two gearings of the two fittings 100, but possibly also, in a direction of travel or in a load direction, greater values which arise from the requirement for additional movements forward or rearward in the presence of backrest load.

One of the two adapter parts 150, 160, in the present case the first adapter part 150, is fixedly connected to the backrest structure 3, whereas, owing to the play S, the other of the two adapter parts 150, 160, in the present case the second adapter part 160, remains movable relative to the backrest structure 3 and relative to the first adapter part 150 and is thus not subject to operating loads during normal use and does not have to overcome significant torques during an adjustment of the backrest inclination angle.

The adjustment of the backrest inclination is realized by way of a transmission rod (not fully illustrated in the figures) which couples the double fitting 10 and the single fitting 20 to one another. Rotation of the transmission rod causes in each case one drive element of each of the three fittings 100 to be driven. Here, the fitting 100 of the double fitting 10, which is directly connected to the backrest structure 3 by way of the first adapter part 150, and the single fitting 20 move the backrest structure 3 about the axis A. The fitting 100 of the double fitting 10, which is connected to the second adapter part 160, is driven synchronously, substantially without load and within its tolerances, but without being in the force flow. This state changes if, in the event of a crash, the elastic or plastic deformation of the fitting 100 connected to the first adapter part 150, or of the bottom part 140 thereof, exceeds the value of the play S, and thus, in said load direction, the two adapter parts 150, 160 come into contact with one another in a circumferential direction; then, during the further course of the loading, both single fittings 100 jointly accommodate the introduced forces.

Figure 3:
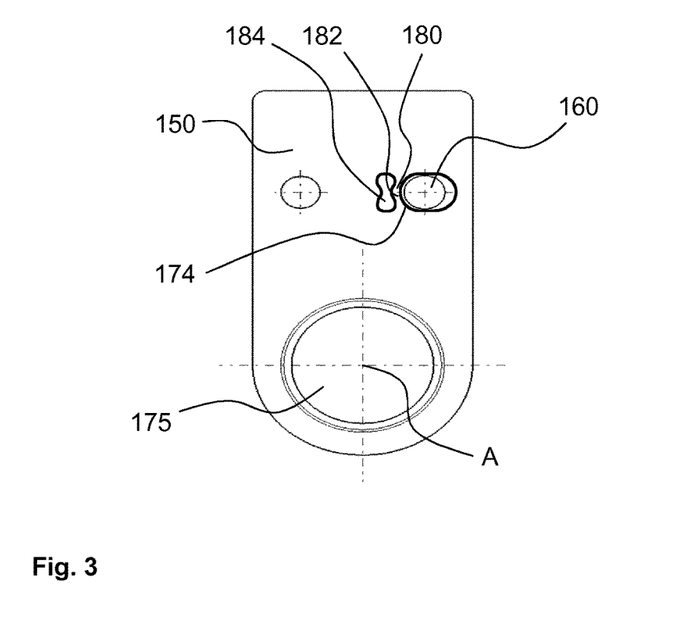
FIG. 3 is a side view of a first adapter part and of a second adapter part of a second exemplary embodiment, wherein the second adapter part is substantially concealed by the first adapter part.

FIG. 3 shows a second exemplary embodiment, the function and design of which correspond to the first exemplary embodiment unless described otherwise below. The first adapter part 150 has a bridge 182 which is arranged between the contact contour 174 and a hole 184 in the first adapter part 150. The bridge 182 forms, together with the hole 184, a deformation zone 180 adjacent to the contact contour 174. It is preferably also the case that the second adapter part 160 has a deformation zone 180 of said type. Under the action of a high load, in particular in the event of a crash, the deformation zone 180 deforms and converts energy.

Figure 4:
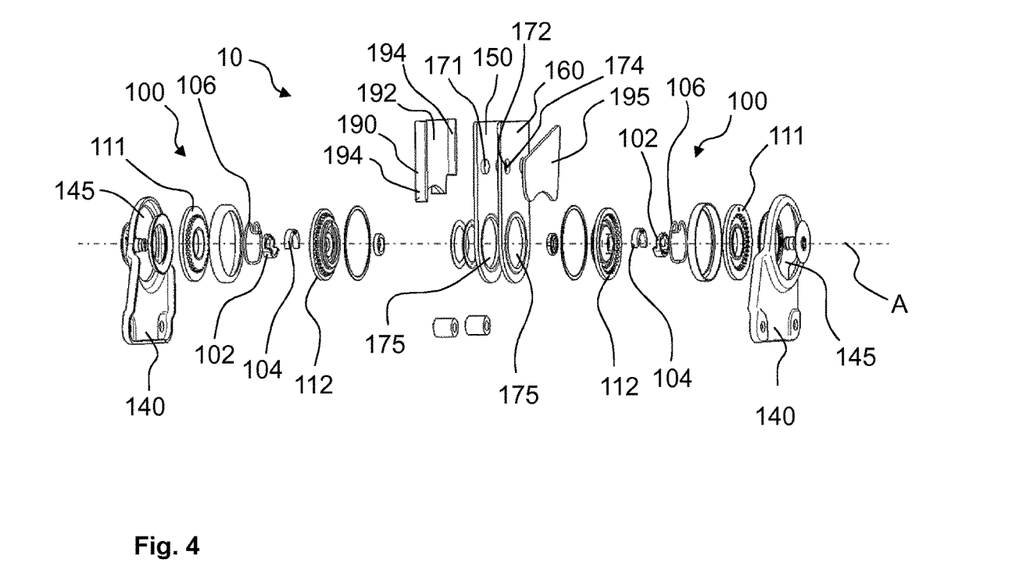
FIG. 4 is an exploded illustration of a double fitting according to a third exemplary embodiment.

FIG. 4 shows all of the components of a double fitting 10 of a third exemplary embodiment. Owing to the exploded illustration, it is possible in each case to see a play compensation mechanism, such as is used for all exemplary embodiments, of each of the two fittings 100, which are in the form of geared fittings. Each play compensation mechanism is composed of a driver 102, two wedge segments 104, and a spring 106. The principle of a play compensation mechanism of said type is described for example in DE 10 2009 053 250 A1. Owing to the number of components and the tolerances thereof, mutual functional impairment between the two fittings 100 of the double fitting 10 would occur if the two fittings 100 were fixedly connected to one another both at the input side and at the output side.

FIG. 4 also shows an engaging-around portion 190 of the third exemplary embodiment for the purposes of ensuring the spatial parallelism of the two adapter parts 150, 160. The engaging-around portion 190 has a U-shaped form. The engaging-around portion 190 comprises a web 192 and two flanges 194, which each project at right angles from the web 192. The web 192 connects the two flanges 194 to one another. The web 192 bears areally against the first adapter part 150 and is connected, preferably welded, thereto. The two flanges 194 receive the first adapter part 150 and the second adapter part 160 between them, but do not bear against these. Between the two flanges 194 and the boundaries of the adapter parts 150, 160 there is a small spacing which is selected such that the second adapter part 160 can move, in the manner described above, relative to the first adapter part 150 before the projections 171 bear against the contact contours 174. It is only under high load that the boundaries of the adapter parts 150, 160 bear against the flanges 194 such that a further possible movement between the adapter parts 150, 160, in particular in a circumferential direction, is additionally prevented by the engaging-around portion 190. In a modification of the third exemplary embodiment, the geometry of the first adapter part 150 is formed differently from the geometry of the second adapter part 160. The boundary of the first adapter part 150 bears against the flanges 194. Between the two flanges 194 and the boundaries of the second adapter part 160 there is a small spacing which is selected such that, in the manner described above, the second adapter part 160 can move relative to the first adapter part 150 before the projections 171 bear against the contact contours 174.

In the present case, the engaging-around portion 190 is connected, preferably welded, to a closing plate 195. The engaging-around portion 190 and the closing plate 195 form, in the present case, a square profile which is passed through by the two adapter parts. By way of the engaging-around portion 190 which is closed by way of the closure plate 195, it is possible for high axial loads to be accommodated by the adapter parts 150, 160.

Figure 5:
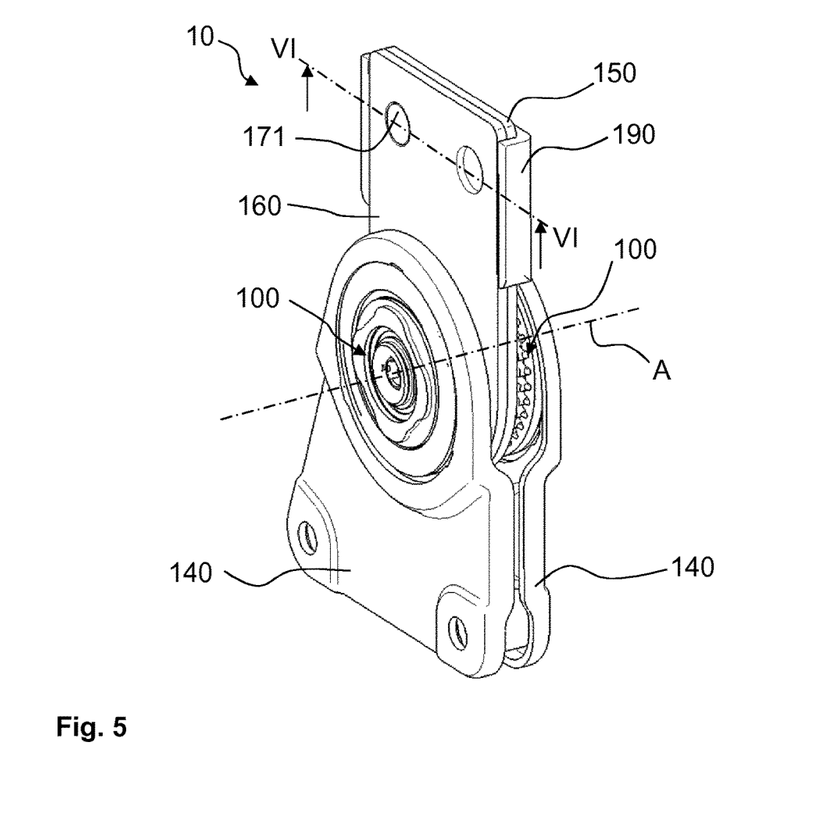
FIG. 5 is a perspective view of a double fitting according to a fourth exemplary embodiment.
Figure 6:
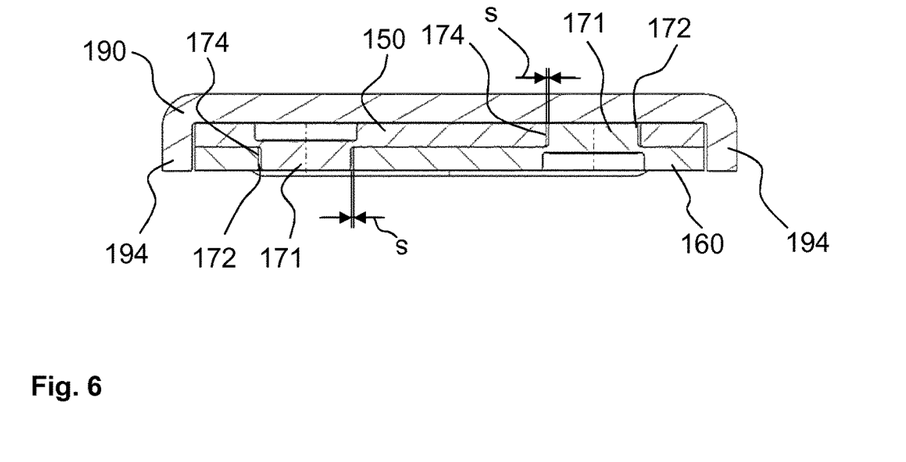
FIG. 6 is a sectional view through the double fitting from FIG. 5 along the line VI-VI.

FIGS. 5 and 6 illustrate a fourth exemplary embodiment of a double fitting 10, the function and design of which substantially correspond to the third exemplary embodiment. By contrast to the third exemplary embodiment the double fitting 10 of the fourth exemplary embodiment duly also has an engaging-around portion 190 but does not have a closure plate 195.

Figure 7:
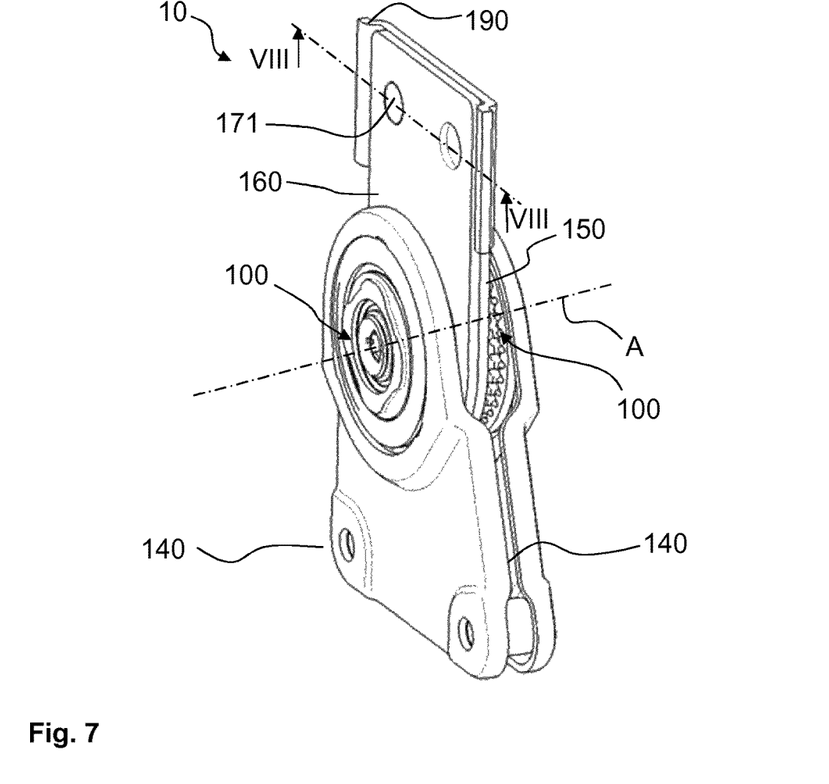
FIG. 7 is a perspective view of a double fitting according to a fifth exemplary embodiment.
Figure 8:
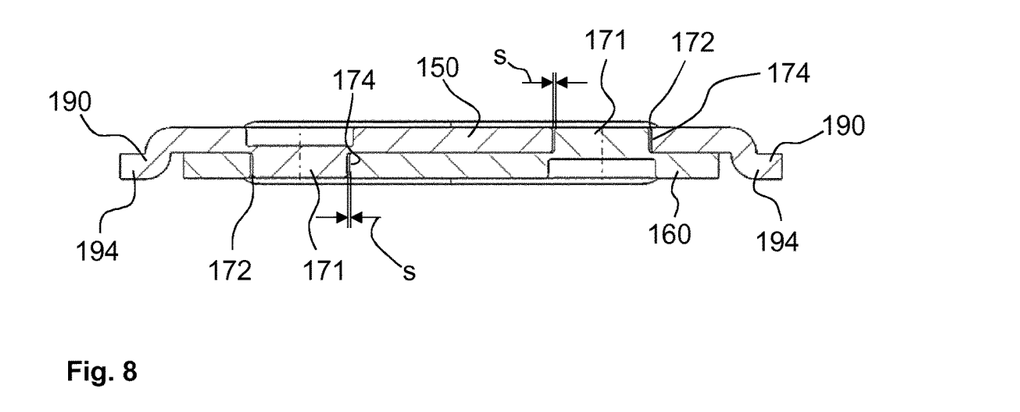
FIG. 8 is a sectional view through the double fitting from FIG. 7 along the line VIII-VIII.

FIGS. 7 and 8 illustrate a fifth exemplary embodiment of a double fitting 10, the function and design of which substantially correspond to the fourth exemplary embodiment. By contrast to the fourth exemplary embodiment, the engaging-around portion 190 is however not a separately formed component but is integrated into the first adapter part 150. For this purpose, in each case one cranked flange 194 is formed on two opposite edge regions of the first adapter part 150. Owing to the integration of the engaging-around portion 190 into the first adapter part 150, said first adapter part is not of identical form to the second adapter part 160.

Figure 9:
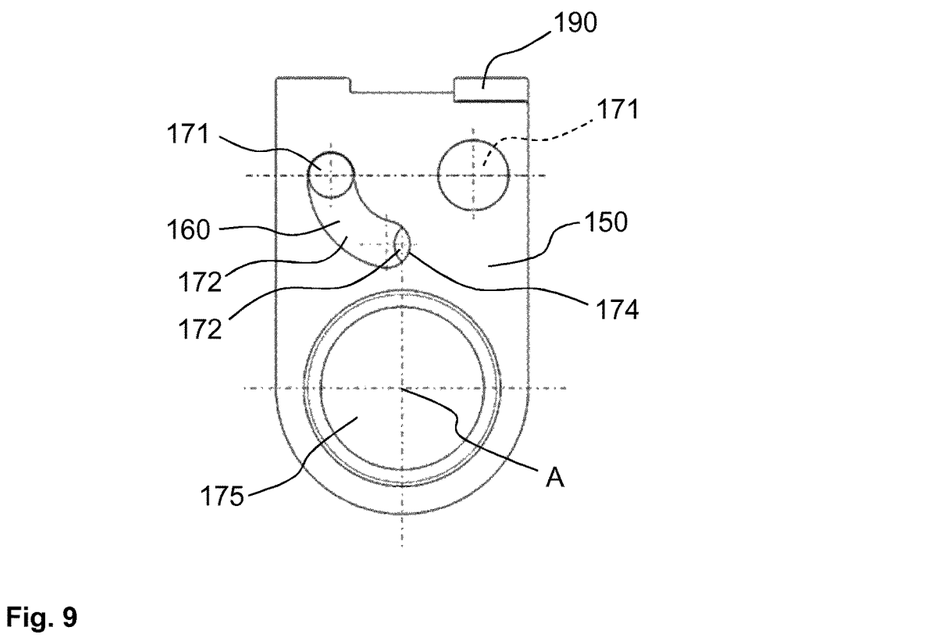
FIG. 9 is a side view of a first adapter part and a second adapter part of a sixth exemplary embodiment, wherein the second adapter part is substantially concealed by the first adapter part.
Figure 10:
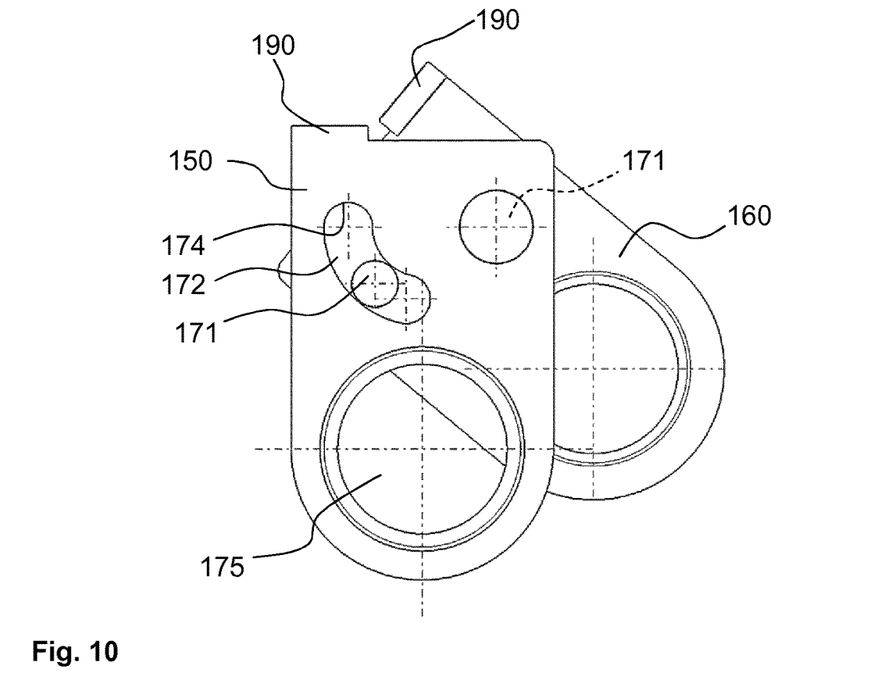
FIG. 10 is a side view corresponding to FIG. 9, wherein the two adapter parts have been rotated relative to one another.

FIGS. 9 and 10 show a sixth exemplary embodiment in which each of the two adapter parts 150, 160 has a hook-shaped engaging-around portion 190 in an edge region facing away from the axis A, which hook-shaped engaging-around portion engages over the respective other of the two adapter parts 150, 160 in the assembled state. The two adapter parts 150, 160 are, during the assembly process, firstly placed onto one another and then rotated relative to one another in order to effect engagement of the engaging-around portions 190 over the respective other adapter part 150, 160 with play, until the two engaging-around portions 190 engage over the respective other adapter part 150, 160.

Figure 11:
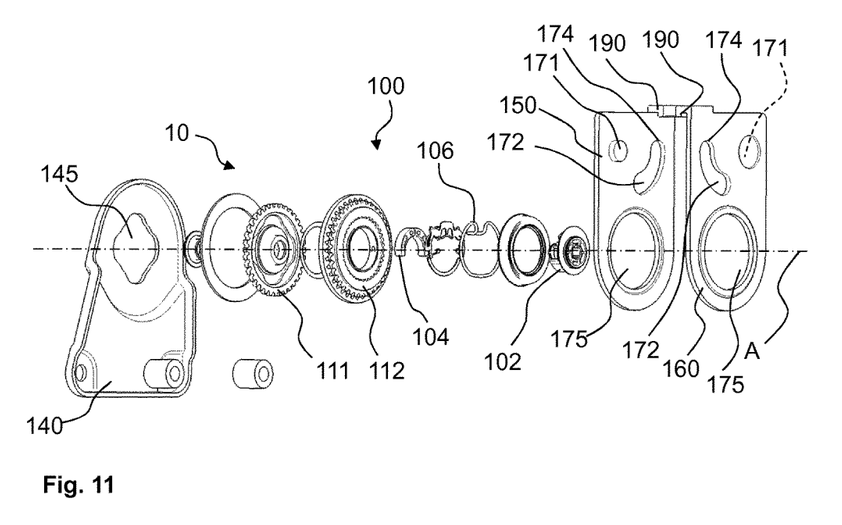
FIG. 11 is an exploded illustration of one half of the double fitting according to the sixth exemplary embodiment.

FIG. 11 is an exploded illustration of the sixth exemplary embodiment. As in the exemplary embodiments 1 to 5, the two fittings 100 are designed as geared fittings 100 with wedge eccentrics.

Figure 12:
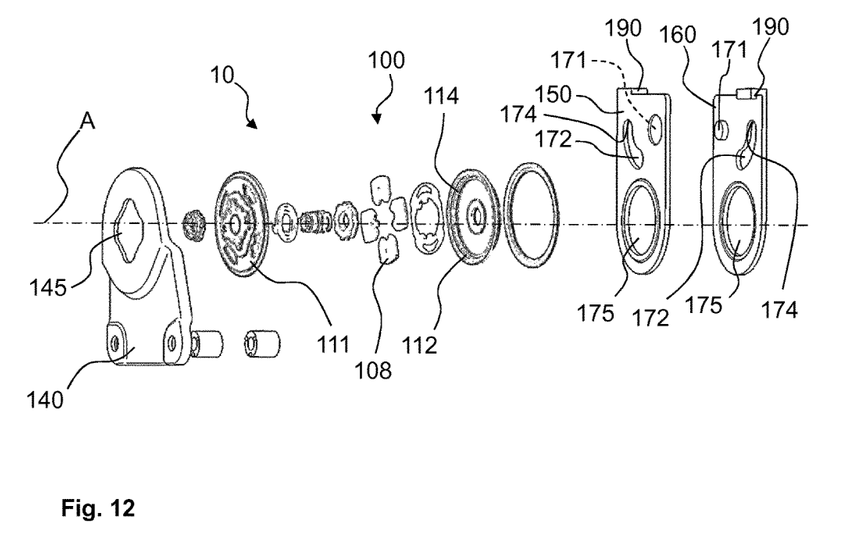
FIG. 12 is an exploded illustration of one half of a double fitting according to a modification of the sixth exemplary embodiment.

The invention is not restricted to geared fittings. The doubling-up of fittings 100 according to the invention for high-load applications may basically also be implemented using detent-type fittings such as are known for example from DE 10 2009 041 490 A1. FIG. 12 is an exploded illustration of one half of a double fitting 10 according to a modification of the sixth exemplary embodiment with two detent-type fittings 100. The two detent fittings comprise in each case one first fitting part 111 and one second fitting part 112, which are rotatable relative to one another about the axis A, and multiple locking bolts 108 which are guided in the first fitting part 111 so as to be movable in a radial direction and which, in the locked state of the fitting 100, interact with a toothed ring 114 of the second fitting part 112.

The solutions presented in the exemplary embodiments with combinations of projections 171 and contact contours 174 in preferably identical adapter parts 150, 160 represent merely a selection of possible design variants of the invention, specifically of the functional decoupling of two fittings 100 which jointly accommodate load. Likewise implementable and encompassed by the meaning of this description are all solutions which use the basic principle of play between assembled fittings, that is to say for example screw connections between an adapter part and the backrest, in the case of which, by way of a spacer ring or the like, a second adapter part is movable relative to a first adapter part to a limited extent defined by the play, and solutions in which the play is realized at the fitting part fixed to the bottom part. Likewise conceivable are riveted connections with stepped bolts or plug-type connections, in which, for example in the case of an embodiment as per FIG. 4 with an engaging-around portion and closing plate, a planar upper part plate on the fitting fixed to the backrest is plugged into, and finally fixed by way of a bottom-part screw connection, into the space which is formed by the engaging-around portion and which is closed on four sides. Such solutions may be advantageous if, depending on the production process, there is a risk of the two adapter parts being bonded by paint during painting of the backrest structure with installed double fitting, wherein said bonding can normally be prevented by definition of a minimum spacing of the adapter part surfaces by way of stamped spacer formations or the like.

It basically cannot be ruled out that the fittings, which are assembled very close together but which are decoupled, may come into contact in an axial direction in the event of extreme torsion or loads acting on the backrest structure during driving operation, which could at least theoretically lead to noise being generated. Therefore, the play described above should also be understood as encompassing solutions in which the play itself between the rigid metallic components can be bridged by way of materials which exhibit a high level of deformation in the presence of low forces, that is to say soft plastics or elastomers.

The features disclosed in the above description, in the claims and in the drawings may be both individually and combinatively of importance for the realization of the invention in its various embodiments.

While specific embodiments of the invention have been shown and described in detail to illustrate the application of the principles of the invention, it will be understood that the invention may be embodied otherwise without departing from such principles.

The invention claimed is:

1. A double fitting for a vehicle seat, the double fitting comprising:
two fittings which are operatively connected to one another, wherein each of the two fittings comprises a first fitting part and a second fitting part which are rotatable relative to one another about an axis, wherein the first fitting part and the second fitting part are in geared connection with one another or can be locked together; and
two adapter parts which are arranged adjacent to one another in an axial direction and of which a first adapter part is connected to one of the two first fitting parts and a second adapter part is connected to the other of the two first fitting parts, or the first adapter part is connected to one of the two second fitting parts and the second adapter part is connected to the other of the two second fitting parts, wherein exactly one of the adapter parts is fixedly connectable to a structure part of the vehicle seat and the other of the two adapter parts is movable to a limited extent about the axis, relative to the structure part and relative to the adapter part which is fixedly connectable to the structure part, one of the two adapter parts having a projection which engages with play into a receptacle of the other of the two adapter parts.

2. The double fitting as claimed in claim 1, wherein the other of the two adapter parts is rotatable to a limited extent about the axis relative to the structure part and relative to the adapter part which is fixedly connectable to the structure part.

3. The double fitting as claimed in claim 1, wherein, after a limited relative movement between the first adapter part and the second adapter part, the projection bears against a contact contour of the receptacle.

4. The double fitting as claimed in claim 3, wherein an engaging-around portion, which is fastened to one of the two adapter parts, engages around the other of the two adapter parts without impeding the limited relative movement between the first adapter part and the second adapter part.

5. The double fitting as claimed in claim 4, wherein the engaging-around portion is of U-shaped form and comprises two flanges which point in an axial direction and which, between them, at least partially receive at least one of the two adapter parts.

6. The double fitting as claimed in claim 1, wherein the first adapter part and the second adapter part each have a projection and a receptacle which engage reciprocally into one another.

7. The double fitting as claimed in claim 1, wherein the receptacle of the adapter part is an opening in said adapter part.

8. The double fitting as claimed in claim 1, wherein at least one of the two adapter parts has a hook-shaped engaging-around portion which engages over the other of the two adapter parts and secures the latter in an axial direction.

9. The double fitting as claimed in claim 1, wherein the two adapter parts are identical parts.

* * * * *